Patented Jan. 13, 1931

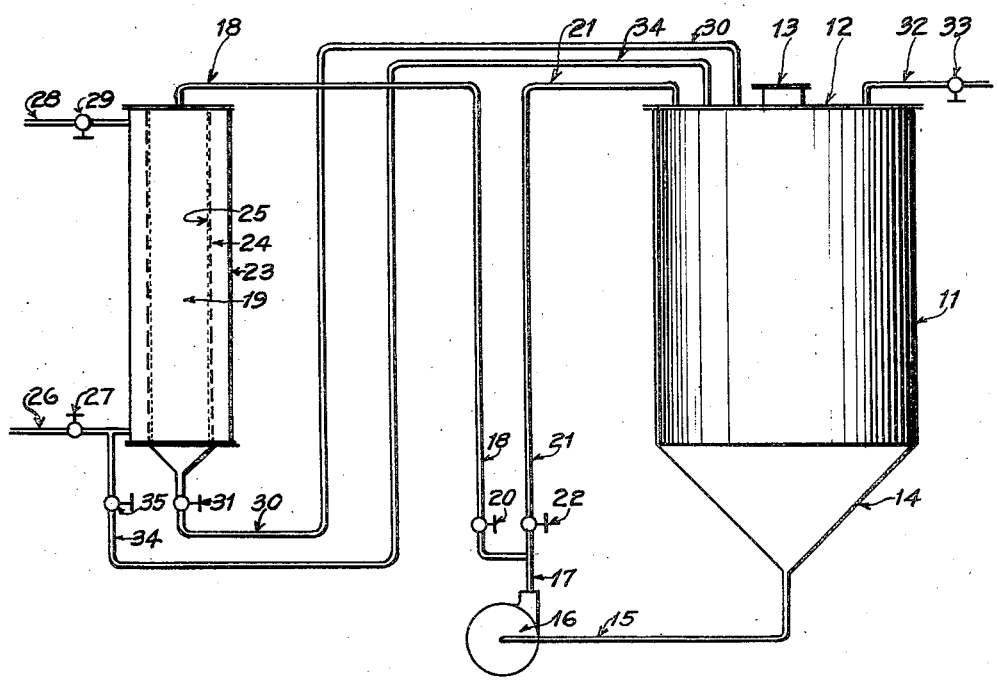

1,789,167

UNITED STATES PATENT OFFICE

HUGH HARLEY CANNON AND WRIGHT W. GARY, OF LOS ANGELES, CALIFORNIA, ASSIGNORS, BY MESNE ASSIGNMENTS, TO CANNON-PRUTZMAN TREATING PROCESSES, LTD., OF LOS ANGELES, CALIFORNIA, A CORPORATION OF CALIFORNIA

CONTINUOUS METHOD FOR SWEETENING PETROLEUM

Application filed January 21, 1929. Serial No. 334,003.

An object of our invention is to provide a method and a reagent for converting the mercaptans or alkyl hydrosulfids which occur in petroleum distillates into the corresponding alkyl disulfids.

A further object of our invention is to provide a method for this purpose which is at once cheaper and more effective than processes heretofore used.

A further object of our invention is to provide a method in which the chemicals applied to the oil for sweetening are continuously and spontaneously regenerated, so that their usefulness continues unimpaired for a very long period.

The hydrosulfids or mercaptans, having the general formula RSH, are found in the distillates from almost all sulfur containing petroleums. The members of this group are chemically unstable, actively attack copper and brass and have a most objectionable odor. They are therefore highly undesirable constituents of commercial gasoline.

The well known process of "sweetening" consists in converting the mercaptans into the corresponding disulfids, bodies which are stable, noncorrosive and of a mild odor. As ordinarily practiced this conversion is effected in two steps. In the first the oil is treated with an aqueous solution of lead oxid (litharge) in caustic soda, this solution containing the hypothetical "sodium plumbite," a body which has not hitherto been prepared in the dry form. By this solution the mercaptans are converted into lead salts, the so-called lead mercaptids, which separate only slowly and incompletely from the oil. In the second step the lead salts are decomposed by the addition of free sulfur, the lead being precipitated as a sulfid while the two alkyl-sulfur radicals previously attached to the lead conjoin to form the dialkyl-disulfid. The reactions which are believed to take place are as follows:

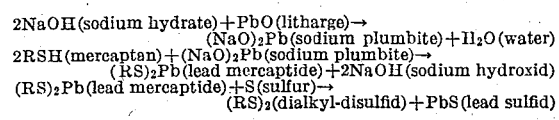

All the sulfur originally present in the mercaptan is also found in the disulfid and the process is therefore not one of desulfurization but is merely the conversion of a compound having deleterious properties into one which is relatively innocuous. It will be understood that the above remarks apply to the prior art.

As described and claimed in a companion application, entitled Reagent for sweetening sulfurous petroleums, filed January 21, 1929, under Serial No. 334,004, we have discovered that by substituting calcium or other alkali earth metal for sodium in preparing the lead-containing reagent, thus making (for example) a calcium plumbite instead of sodium plumbite, we gain greatly in economy and convenience. The reagent is cheaper to make and to apply to the oil and more readily subject to revivification, the latter advantages being attendant on its physical condition as a dry powder rather than a solution. In the companion application referred to, the reagent is expended in converting the mercaptans and, before it is reused, is subjected to an extraneous revivification step by which its usefulness is restored, at a material expense for the handling incident to the recovery step.

We have further discovered that if a reagent containing the same active materials as the reagent just referred to (though preferably in a different proportion and with the addition of an inert porous body) be applied to an oil containing mercaptans in the manner about to be described, we are able to convert to the disulfid form not merely the quantity of mercaptans corresponding to the lead content in any given quantity of the reagent, but a very much greater quantity, the reaction being of a continuous or cyclic nature and the active lead salt being constantly reconstituted as fast as it is consumed without outside aid or intervention.

In the intermittent or batch process, to which the companion application refers, a mixture or compound of calcium hydroxid (or other alkali earth metal hydroxid) and lead monoxid (litharge) is prepared, this reagent being probably calcium plumbite. A suitable quantity of this reagent, in powdered form, is agitated with the oil, converting the mercaptans to lead mercaptids. Finely pulverized sulfur is then added to the oil in quantity sufficient to precipitate the lead as a sulfid, the dialkyl-disulfids being formed by this removal of lead. The spent reagent is then separated from the oil and either discarded or recovered for reuse. The reactions taking place are believed to be as follows, R indicating any alkali group:

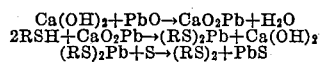

Our improved continuous process consists of two stages or steps. In the first stage a desired quantity of the oil to be treated is agitated with a reagent similar to the above but including an amount of free sulfur corresponding to the last equation in the above reaction, and, optionally, a small proportion of inert porous material. After a variable lapse of time the oil becomes "sweet" (free from mercaptans) and the suspended powder then contains calcium hydrate, lead sulfid and probably some unconsumed calcium plumbite.

At the end of this stage, instead of separating and discarding the spent reagent we pump the oil in which it is suspended into a filter press, thus forming the spent reagent into a cake or layer on the filter cloth. We then proceed to the second stage, which consists in forcing through this cake further quantities of "sour" oil (oil containing mercaptans), adding to the stream of oil, either continuously or at intervals, such quantity of sulfur as is required to split the mercaptid formed by the combination of lead with the mercaptans of the oil. The oil passing through the nominally spent cake comes through "sweet," and continues to do so for a long time thereafter; so long a time that we are uncertain as to the actual length of life of any given cake. We have in this manner sweetened with a single cake up to ten times the quantity of oil which the amount of reagent contained in the cake would have sweetened by the batch process.

It is evident that in this second stage of the treatment the lead sulfid is continuously reconverted to an active form, and while we are by no means certain as to what changes take place during the reaction cycle we believe them to be as follows:

(a) The first stage reactions are as above stated, yielding a final reaction product containing

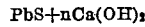

(b) The second stage reactions appear to be

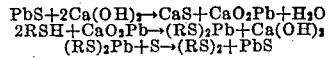

which brings us back to the starting point and accounts for the final consumption of one atom of sulfur and one molecule of calcium hydroxid for every two molecules of mercaptan converted or, in other words, for each two atoms of sulfur contained in the original mercaptan. In this view, the required dosage of sulfur is one-half the quantity of sulfur contained in the oil in the form of mercaptan. This dosage, with the reservation hereinafter stated, appears to give satisfaction in practical application.

Another view of the mechanism of the cyclic reaction is that it involves the reversible reaction

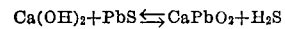

with the possible intermediate reactions

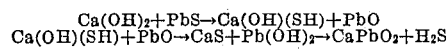

The surfur being loosely bonded and balancing between PbS and $H_2S$ or CaS may become fixed in the oil as an additional quantity of a sweet sulfid, as for instance the disulfid, and thus disappear. The quantity of sulfur present as mercaptan is usually so small that its addition to the fixed sulfur content of the oil is not readily determinable by analysis.

It should be understood that the above reactions are only tentative and that we do not limit our invention in attempting to explain what takes place in the second stage of the operation. Whatever its mechanism may be, some regenerative reaction does take place by means of which the activity and effectiveness of the reagent are maintained through a long period of usefulness after the initial exhaustion in the first stage of the operation as above described.

In a practical way we prepare the reagent in the following manner. We mix with water three parts of litharge with one part of commercial hydrated lime, this proportion of lime being a minimum and being by preference materially increased. Sufficient water should be used to produce an evenly dampened mass, though for convenience we prefer to use a larger quantity of water, enough to bring the mass to a creamy consistency. We also prefer to add a relatively small quantity of a light porous earth such as diatomaceous earth, this quantity being upward from ten percent of the weight of the other solid constituents. The addition of earth is made for the combined purpose of rendering the cake more readily permeable by the oil and of increasing the surface exposure of solid chemical to the oil, and should be considered as desirable but not essential.

The most desirable ratio of lime to lead in the mixture cannot be definitely fixed. The combining weights of calcium hydroxid and lead monoxid are as $$Ca(OH)_2 : PbO :: 74 : 223$$

or almost exactly one part lime to three parts litharge. An excess of lead, while wasteful, does not impair the efficiency of the reagent except as regards its life. On the other hand, there is some indication that lime is consumed during the second stage of the treatment and in practice it appears that cakes containing an excess of lime are longer lived than such as contain an excess of lead. Inasmuch as lime is by far the cheaper ingredient we therefore prefer to use it in material excess, and without limiting ourselves to the proportions given, we suggest a mixture consisting of

| | Parts by weight |
|---|---|
| Calcium hydroxid | 50 |
| Lead monoxid | 30 |
| Diatomaceous earth | 20 |

We have, however, used mixtures ranging in composition from ten lime ninety lead to ninety lime ten lead, with at least moderate satisfaction in each case.

Any excess of water being removed, as by filtration, the mass is dried. Any drying means may be used and the operation may be conducted at any temperature up to at least 300° F. Drying should be continued at least to the point where the mass may be finely pulverized without balling or sticking. This maximum will depend somewhat on the proportion of earth used. The above mixture containing 20% of earth may retain up to 45% water and still be pulverable while mixtures free from earth may require to be dried to a maximum of 30% water. The proportion of water appears to have no influence on the value of the reagent except as it controls the proportion of actual reagent in a given weight. If preferred the material may be rendered substantially dry, i. e., it may be dried to constant weight at 300° F. At this point it will retain from 1% to 4% free water. The dried material is finally ground to a fine powder, say to pass a 150 mesh screen.

The next step in a systematic treatment is to agitate a portion of this powder with a quantity of oil containing mercaptans, and to add a small amount of sulfur either to the powder or to the oil. The point at which this addition is made appears to be a matter of no consequence; the sulfur may be added to the powder before it is mixed with the oil, or the addition may be made to the oil immediately after the powder is intermixed or some time thereafter. The reagent does not reach its full reactivity with mercaptans until some time after the sulfur is added, and it is probably desirable to add the sulfur either with the powder or almost immediately after it is mixed with the oil. The sulfur should not be added to the mixture before drying, as this will result in the production of an inactive form of lead sulfid.

The proportion of reagent powder to oil to be taken for this initial step is limited in one direction only—it must be sufficient to sweeten the quantity of oil taken, but may be much greater if preferred. Such quantity of reagent should be taken as will produce a cake of the desired thickness in the particular filter press to be used. This thickness may be governed by three considerations. The thicker the cake the more rapidly may the sour oil be passed through it while allowing sufficient time of contact. Again, the thicker the cake the more reagent will it contain per unit of area and thus, assuming a consumption of one of the ingredients of the cake, the longer will be its life. On the other hand, the thicker the cake the greater will be the resistance to the flow of oil through it. We have found in practice that the cake should not be much thinner than one-fourth inch and that it may be up to four times this thickness without setting up a serious back pressure. A quarter inch cake is capable of converting an extremely sour oil (testing 33% with standard sodium hypoclorite solution) at a flow rate of from 12 to 25 gallons per hour, and a faintly sour oil (testing 1% hypo solution) at a rate of from 100 to 250 gallons. At these rates the pressure is low.

After a sufficient time of agitation, which may be a few minutes or several hours, the oil becomes sweet and the reagent changes in color from white to blackish-gray, due to the formation of lead sulfid. The oil is now pumped through a filter press, the reagent collecting on the cloths to form a thin layer or cake. Care should be taken to distribute the reagent evenly on the cloths, avoiding thin spots, and it is desirable to use a type of press and a pump arrangement such as will permit circulation through the press in order to keep the heavy reagent from settling out before it reaches its destined position on the cloth.

For this purpose the simple arrangement shown in the attached drawing is suggested. In this drawing Figure 1 illustrates in a highly diagrammatic manner an arrangement of press, agitating tank and filter which is suitable for the carrying out of our method invention. In the figure, 11 is a steel agitator or feed tank provided with a closed top 12 and a hinged manhole plate 13 for the introduction of dry powder.

The tank has a conical bottom 14, the point of which communicates through pipe 15 with a pump 16, which may be of centrifugal, rotary or other preferred type, driven by means not shown. The discharge 17 of this pump branches into two pipes; 18 which communicates with the top of the filter 19 and is controlled by valve 20, and 21 which communicates with the top of the tank 11 and is controlled by valve 22. The filter consists of an outer shell 23 and an inner supporting tube 24, which may be of stiff wire screen or other material which will afford support to a tube 25 of cotton or other filter cloth and which will permit free passage to such liquid as passes through the cloth. The outer shell is provided at the bottom with a drain pipe 26 controlled by valve 27, for carrying away sweetened oil, and at or near the top with an inlet pipe 28 controlled by valve 29, for the introduction into the shell of air or other fluid under pressure. The lower end of the tube communicates with the top of tank 11 through pipe 30 controlled by valve 31. A pipe 32 controlled by valve 33 affords communication between the tank and a source of supply of sour oil. A branch pipe 34 controlled by valve 35 affords communication between the sweet oil drain 26 and the top of tank 11.

To perform the operations already described, tank 11 is filled to a desired level with sour oil by opening valve 33, which is closed when such level is reached. The pump 16 is then put into operation, valve 22 being open and valve 20 closed, thus circulating the oil from the bottom of the tank back into its top. The required charge of powder is then introduced into the tank through manhole 13 and the necessary amount of sulfur shortly thereafter, care being taken to make these additions gradually so as not to choke the pump. Circulation is then continued until the powder is evenly diffused through the oil and as long thereafter as may be required to produce the above described reaction between the powder and the oil and to sweeten the oil contained in the tank.

Valve 20 is now opened and valve 22 closed, thus diverting the pump discharge into the press. At this time valve 29 on the air inlet should be closed, valve 27 on the sweet oil drain open and valve 31 choked down sufficiently to place the desired pressure on the press. The delivery of the pump should be such that at least twice as much oil will enter the press through pipe 18 as can pass through the cloth 25 and the supporting tube 24 to the sweet oil drain 26, and it is better to have not less than three-quarters of the pump delivery leave the press and return to the agitating tank through the pipe 30. This ensures the formation of an even layer on the cloths by keeping the reagent in suspension. If necessary the delivery of the press, during the cake forming stage, may be reduced by partially closing valve 27.

In place of the continued agitation above described the cake may be formed in the press immediately after adding the sulfur and the oil then circulated repeatedly through the cake until the sulfid forms in the cake and the oil becomes sweet. To obtain this circulation valve 27 is closed and valve 35 opened or partially opened, thus permitting the press effluent to flow back into tank 11. The object of either procedure is merely to maintain contact between the oil and the reagent until these changes occur.

The cake having been formed and activated in either manner, valve 35 (if open) is closed, valve 27 opened and the sweetened oil discharged to a suitable tank not shown, and valve 32 opened to a sufficient degree to maintain the desired level in tank 11 by replacing the oil withdrawn through the press. At the same time valves 27 and 31 should be regulated to pass the oil through the press at such rate that it will come through perfectly sweet. This feeding of sour oil into the tank and withdrawal of sweet oil from the press, with the addition to tank 11 from time to time of small quantities of sulfur, may now be continued until the rate of delivery from the press falls below a desired minimum rate, because of decreased permeability of the cake, or until the oil fails to come through sweet at this minimum speed, because of depreciation of the chemical constituents of the cake.

The proportion of sulfur to be added with the sour oil as fed and the proportion which should be added to the original batch may readily be determined if the percentage of sulfur existing as mercaptan in the sour oil is known. It will be seen from the equations above that the added sulfur should be just one half the mercaptan sulfur. If this proportion is not known the effluent from the press may be sampled from time to time and tested. If the oil reacts sour in the well known "doctor test" the proportion of sulfur being added is too small, while if the oil gives a positive indication in the corrosion test the proportion is too large. Because of its tendency to render the oil corrosive the addition of any material excess of sulfur must be avoided. It is not necessary to feed the sulfur continuously; if the oil is being fed from a tank such as that shown in the figure the quantity of sulfur required for the entire charge may be added to the oil at once, or if it is being fed in a stream from such source that the sulfur cannot be added to a body of the oil, the sulfur may be injected into the stream in small quantities at frequent intervals. A suspension of the finely ground sulfur in a small quantity of oil may conveniently be used for feeding into the stream, as by means of a minute pump synchronized with a meter on the oil line.

We have noted that in the long continued use of a single dose of reagent the proportion of sulfur required to produce a sweet oil gradually diminishes and becomes less than the calculated quantity. The reason for this we do not know, but the observation is important as it indicates that too much dependence should not be placed on a calculation of the proportion of sulfur required, but that the stream of oil should from time to time be tested, not only for sweetness but also for its corrosive properties, in order that the continuous addition of an excess of free sulfur may be avoided.

After the passage of a large quantity of oil through a single cake the rate of flow is liable to fall below a commercially satisfactory rate. The cake becomes denser and offers more resistance to the passage of the oil. This increase in density is undoubtedly due in part to a mere physical settling and packing of the particles of which the cake is composed, but we believe it to be due in part to the removal of plumbite from the interior of the cake and the redeposition of the lead as a finely divided lead sulfid on its intake face. Whatever the reason, the difficulty may be overcome and the original flow rate reestablished by breaking down the cake and remixing it with the oil contained in tank 11. To accomplish this we fully open valve 31, valve 22 being closed, and also close valve 27, thus stopping the filtering action and raising the flow of oil through tube 25 to the highest velocity. We then partially open valve 29 and introduce into the shell 23 a fluid under pressure, such fluid for instance being air or sweetened oil. This fluid pressure, coming onto the reverse side of the cloth 25, breaks and dislodges the cake, which is swept forward by the velocity of the oil stream through pipe 30 and thus back to the tank. A few minutes circulation will completely diffuse the cake material in the oil, after which a new cake may be built up as previously described. This cake will be found to have substantially the original permeability and flow rate.

The quantity of oil which may thus be sweetened with a single charge of the reagent chemical is very great, but the exact life of the reagent is not known and is undoubtedly variable. We have observed that after long continued use the activity of the reagent diminishes, and that the activity may be reestablished by the addition of small quantities of lead monoxid. It is probable, though not certain, that there is some conversion of lime into the sulfid, but the rate of consumption is so exceedingly low that it is not likely that this is a determining factor in the life of the reagent. Theoretically there is no consumption of lead but in practice it does disappear very slowly, probably minute quantities are carried away in the sweetened oil in the form of lead mercaptid. Certainly some of the lead is precipitated on the walls of the apparatus and connecting pipes in the form of lead sulfid, and in putting new apparatus into operation this may cause the withdrawal from the cycle of a material quantity of lead until such time as all crevices and areas of low velocity are filled and coated. At the worst the loss of lead in either manner is minute as compared with the consumption of this element in the processes heretofore used, and by replacing this small loss the reagent may be maintained in effective form indefinitely, so far as we presently know.

While we have described the application of oil and sulfur to the reagent in a filter press we would have it understood that our invention is not limited to this particular manupulation. We may form the reagent into a pack on trays or in the bottom of a percolator and pass the oil through this pack by gravity or under pressure, or we may utilize the well known counterflow thickening apparatus in which the reagent carried forward in suspension is continuously returned to the first contacting vessel, or we may even work in a semi-continuous manner, separating the reagent from the sweetened oil, returning it with the required sulfur to a batch of sour oil, intermixing until the oil is sweetened and the reagent activated, and separating the reagent to be applied to another batch of oil, and so on seriatum. These various methods differ only as to convenience, the final result in each case being the same—the contacting of progressive quantities of sour oil with unit quantities of reagent, which reagent is maintained in active condition by the addition of free sulfur in quantities proportionate to the quantity of oil passing through the contacting system.

We would also have it understood that while we have, to avoid constant repetition, referred to the use of calcium hydroxid, substantially the same results may be had in substituting, wholly or in part, hydroxids of any of the metals in Group 2 of the periodic system, and in particular the hydroxids of barium, strontium, magnesium and zinc.

Where, in the above specification and the attached claims, we refer to "sour oil", we would be understood to mean a petroleum product which on agitation with an aqueous solution of litharge in caustic soda (the well known "doctor solution") and the addition of a small quantity of free sulfur, gives a discoloration due to the formation of lead sulfid, such oil being considered to contain mercaptans or alkyl hydrosulfids. When we refer to a "sweet oil" we would be understood to refer to a petroleum product which gives a negative indication to such test, and which is substantially free from the aforesaid mercaptans, though it may and usually does contain sulfur in other combinations.

We claim as our invention:

1. A process for sweetening sour oil, comprising: treating sour oil with an incoherent comminuted solid reagent comprising calcium hydroxid, lead monoxid and sulfur; separating the sweetened oil from said reagent, and treating further quantities of sour oil with said separated reagent and further quantities of sulfur.

2. A process for sweetening sour oil, comprising: treating sour oil with an incoherent comminuted solid reagent comprising calcium hydroxid and lead monoxid in the presence of free sulfur; separating the sweetened oil from said reagent, and treating further quantities of sour oil with said separated reagent and further quantities of sulfur.

3. A process for sweetening sour oil, comprising: treating sour oil with an incoherent comminuted solid reagent comprising lead monoxid, a hyroxid of a Group 2 metal and sulfur; separating the sweetened oil from said reagent, and treating further quantities of sour oil with said separated reagent and further quantities of sulfur.

4. A process for sweetening sour oil, comprising: treating sour oil with an incoherent comminuted solid reagent comprising lead monoxid, a hydroxid of a Group 2 metal in the presence of free sulfur; separating the sweetened oil from said reagent, and treating further quantities of sour oil with said separated reagent and further quantities of sulfur.

5. A process for sweetening sour oil, comprising: treating sour oil with an incoherent comminuted solid reagent comprising calcium hydroxid, lead monoxid, a light porous inert material and sulfur; separating the sweetened oil from said reagent; and treating further quantities of sour oil with said separated reagent and further quantities of sulfur.

6. A process for sweetening sour oil, comprising: treating sour oil with an incoherent comminuted solid reagent comprising calcium hydroxid, lead monoxid and a light porous inert material in the presence of free sulfur; separating the sweetened oil from said reagent; and treating further quantities of sour oil with said separated reagent and further quantities of sulfur.

7. A process for sweetening sour oil, comprising: treating sour oil with an incoherent comminuted solid reagent comprising lead monoxid, a hydroxid of a Group 2 metal, a light porous inert material and sulfur; separating the sweetened oil from said reagent, and treating further quantities of sour oil with said separated reagent and further quantities of sulfur.

8. A process for sweetening sour oil, comprising: treating sour oil with an incoherent comminuted solid reagent comprising lead monoxid, a hydroxid of a Group 2 metal and a light porous inert material in the presence of free sulfur; separating the sweetened oil from said reagent, and treating further quantities of sour oil with said separated reagent and further quantities of sulfur.

9. A process of sweetening sour oil, comprising: contacting an incoherent comminuted solid reagent containing calcium hydroxid, lead monoxid and sulfur with progressive quantities of sour oil, whereby said oil is sweetened, and maintaining the activity of said reagent by the progressive addition of sulfur.

10. A process of sweetening sour oil, comprising: contacting an incoherent comminuted solid reagent containing lead monoxid, a hydroxid of a Group 2 metal and sulfur with progressive quantities of sour oil, whereby said oil is sweetened, and maintaining the activity of said reagent by the progressive addition of sulfur.

11. A process of sweetening sour oil, comprising: contacting an incoherent comminuted solid reagent containing calcium hydroxid, lead monoxid, a light porous nonreactive material and sulfur with progressive quantities of sour oil, whereby said oil is sweetened, and maintaining the activity of said reagent by the progressive addition of sulfur.

12. A process of sweetening sour oil, comprising: contacting an incoherent comminuted solid reagent containing lead monoxid, a hydroxid of a Group 2 metal, a light porous nonreactive material and sulfur with progressive quantities of sour oil, whereby said oil is sweetened, and maintaining the activity of said reagent by the progressive addition of sulfur.

13. A process for sweetening sour oil comprising: intimately contacting a portion of said oil with a body of incoherent comminuted solid reagent comprising lead monoxid and calcium hydroxid in the presence of free sulfur; introducing to contact with said body further quantities of sour oil together with further free sulfur, and withdrawing from contact with said body oil sweetened by said contact.

14. A process for sweetening sour oil comprising: intimately contacting a portion of said oil with a body of incoherent comminuted solid reagent comprising lead monoxid and a hydroxid of an alkali earth metal in the presence of free sulfur; introducing to contact with said body further quantities of sour oil together with further free sulfur and withdrawing from contact with said body oil sweetened by said contact.

15. A continuous process for sweetening sour oil, comprising: establishing a flow stream of sour oil; intimately contacting said flow stream with an incoherent comminuted solid reagent comprising lead monoxid and calcium hydroxid; continuously introducing into the zone of contact free sulfur in quantity only sufficient to sweeten said sour oil, and continuously withdrawing a flow stream of sweetened oil, free from reagent, from said zone of contact.

16. A continuous process for sweetening sour oil, comprising: establishing a flow stream of sour oil; intimately contacting said flow stream with an incoherent comminuted solid reagent comprising lead monoxid and a hydroxid of an alkali earth metal; continuously introducing into the zone of contact free sulfur in quantity only sufficient to sweeten said sour oil, and continuously withdrawing a flow stream of sweetened oil, free from reagent, from said zone of contact.

In witness that we claim the foregoing we have hereunto subscribed our names this 31st day of December, 1928.

HUGH HARLEY CANNON.
WRIGHT W. GARY.